United States Patent [19]
Smith et al.

[11] Patent Number: 5,903,631
[45] Date of Patent: May 11, 1999

[54] ONE-BUTTON INTELLIGENT CTI DIALLER

[75] Inventors: Donald Smith; Pat Orchard, both of Nepean, Canada

[73] Assignee: Mitel Corporation, Kanata, Canada

[21] Appl. No.: 08/815,564

[22] Filed: Mar. 12, 1997

[51] Int. Cl.⁶ .................................................. H04M 11/00
[52] U.S. Cl. ............................ 379/90.01; 379/100.14; 379/355
[58] Field of Search ............................ 379/93.17, 93.19, 379/93.21, 93.23, 90.01, 216, 355, 356, 357

[56] References Cited

U.S. PATENT DOCUMENTS

| | | |
|---|---|---|
| 4,748,656 | 5/1988 | Gibbs et al. . |
| 4,866,758 | 9/1989 | Heinzelmann . |
| 4,870,677 | 9/1989 | Di Santo et al. . |
| 5,359,651 | 10/1994 | Draganoff ............................ 379/93.23 |
| 5,386,459 | 1/1995 | Veeneman et al. . |
| 5,390,240 | 2/1995 | Sensney . |
| 5,515,423 | 5/1996 | Beck et al. . |
| 5,522,089 | 5/1996 | Kikinis et al. . |
| 5,541,988 | 7/1996 | Draganoff . |
| 5,608,786 | 3/1997 | Gordon ............................... 379/100.16 |
| 5,721,958 | 2/1998 | Kikinis .................................... 395/888 |

FOREIGN PATENT DOCUMENTS 2318703   4/1998   United Kingdom .

*Primary Examiner*—Curtis A. Kuntz
*Assistant Examiner*—Melur Ramakrishnaiah
*Attorney, Agent, or Firm*—Jones, Day, Reavis & Pogue

[57] ABSTRACT

A method and apparatus for dialling out via a phone device a phone number displayed within a screen image generated by a software application executed on a computer. The computer is connected to the phone device, and the phone device includes a dial button. In response to activation of the dial button, a process is spawned within the computer for locating the phone number within the screen image and transmitting the phone number to the phone device whereupon the phone device dials out the phone number.

10 Claims, 2 Drawing Sheets

ONE-BUTTON INTELLIGENT CTI DIALLER

FIELD OF THE INVENTION

This invention relates in general to phone diallers, and more particularly to a one-button dialler for use in a CTI (Computer Telephony Integration) communication system.

BACKGROUND OF THE INVENTION

CTI has evolved with the intention of simplifying telephone communications through the use of computers. For example, PC-based call processing, enhanced directory applications and automated attendant functions allow a person to integrate telephone and computer functionality. However, one telephony function - placing a call, is more complicated when executed by computer than when direct dialled on a phone set. Making a phone call from a PC (Personal Computer) usually involves several steps. First, the current application (e.g. MS Word®) is minimised or closed. Second, the CTI application is opened. Third, the phone number is entered using either a numeric keypad or via point-and-click numbers. Then, an "accept" or "dial" button is clicked in the CTI application, resulting in the PC directing the associated telephone to dial out the phone number.

In an effort to simplify dialling, some CTI applications mimic phone speed dialling by using directory applications. However, the user nonetheless is required to navigate the directory which can often take longer than simply picking up the phone and dialling the number.

The general concept of automatic dialling under computer or microprocessor control is well known in the prior art, as for example, disclosed in Di Santo et al (U.S. Pat. No. 4,870,677), Kikinis et al (U.S. Pat. No. 5,522,089) and Draganoff (U.S. Pat. No. 5,541,988).

In Di Santo et al a telephone number is displayed on a programmable display portion of a telephone set and once selected (via a cursor) one-button dialling results in out-pulsing of the selected telephone number. This system is essentially an enhanced speed dial with directory display on the telephone set.

In Kikinis, the telephone number can be dialled under operating system control. The telephone number is selected via cursor point-and-click, and then an "OK" button is used to dial the digit.

Draganoff teaches the use of one-button automatic dialling such that, once a telephone number and other alpha-numeric data have been selected on a notebook or PC, depression of the "Tel" button on the keypad results in dialling via an interface circuit, which receives the telephone number from a CPU via a buffer.

Draganoff is relevant for teaching one-button dialling once a telephone number has been "selected" in a computer application. However, there is no teaching or suggestion in Draganoff (or any of the other references discussed above) of any means for overcoming the prior art difficulty of finding a telephone number and then dialling it in a straightforward, uncomplicated manner.

SUMMARY OF THE INVENTION

According to the present invention, a CTI process is provided for implementing one-touch dialling from any application active on a PC. The process of the present invention employs a hierarchical method of locating a phone number to dial from text displayed on the PC screen by the active (or background) applications. Therefore, the method and apparatus of the present invention overcomes the difficulties in the prior art of navigating through complex procedures to find and then dial a phone number.

BRIEF DESCRIPTION OF THE DRAWINGS

A detailed description of the preferred embodiment is provided herein below with reference to the following drawings, in which.

DETAILED DESCRIPTION OF THE PREFERRED EMBODIMENT

Figure 1:
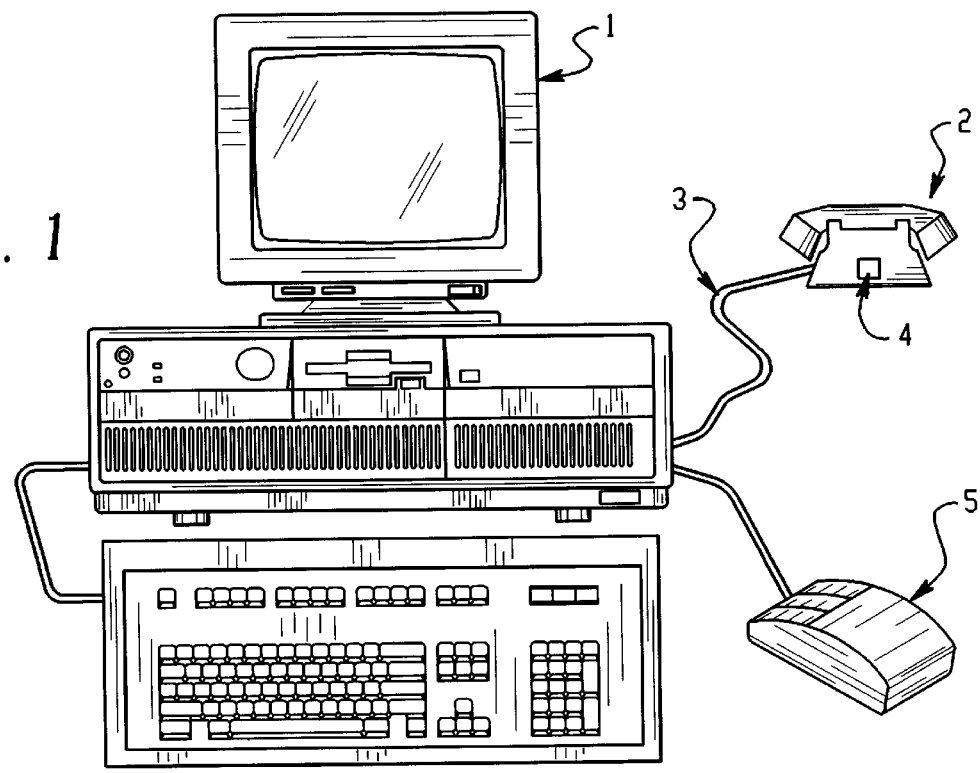
FIG. 1 is a schematic representation of a CTI system for implementing the one-button intelligent dialler of the present invention.

FIG. 1 shows a CTI system comprising a PC 1, a phone 2, and a communication line 3 between the PC 1 and phone 2 (e.g. USB connection, TAPI, etc.). According to the invention, phone 2 is provided with a one-touch dial button 4. A mouse pointer 5 is connected to PC 1 in the usual manner.

PC 1 executes various software including operating system 10 (e.g. Windows NT®, Windows 95®), USB (or other) driver 11, a plurality of applications 13 (e.g. Word®), a spawned process 13 in accordance with the invention, and an inter-application/process communication protocol 15 (e.g. OLE for Windows NT®). This software is resident in RAM memory 31 and executed via CPU 32 in a well known manner.

Figure 2:
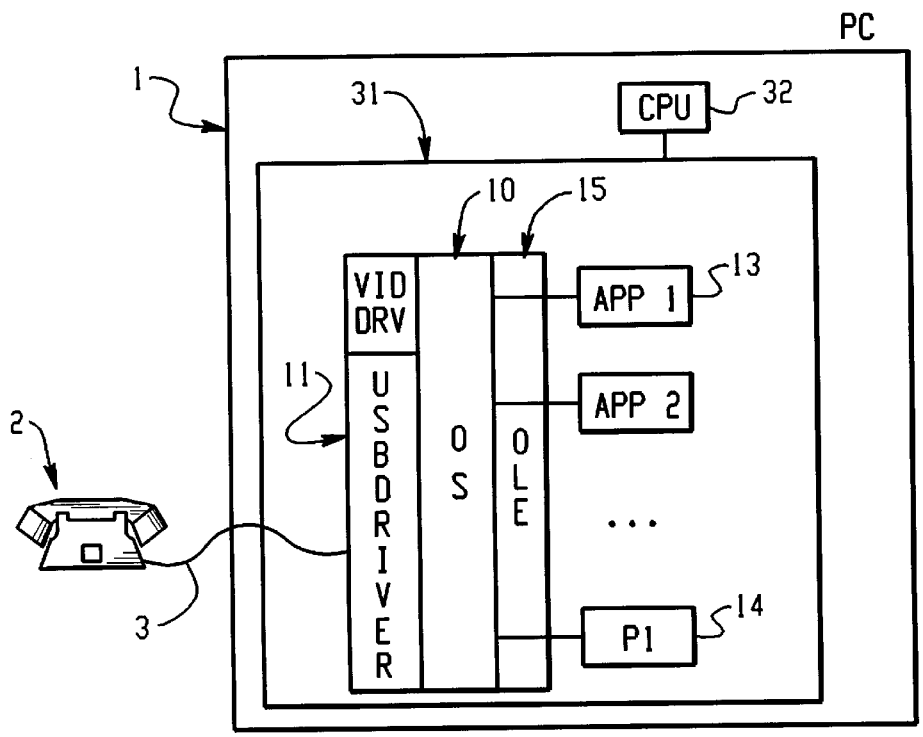
FIG. 2 is a schematic representation of a PC connected to a phone, incorporating software for implementing the preferred embodiment.
Figure 3:
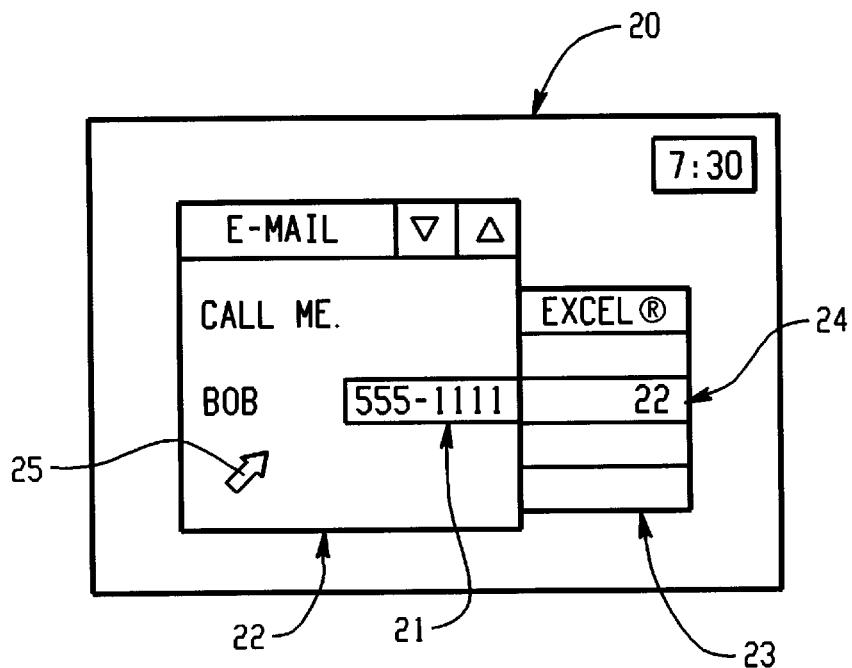
FIG. 3 is a schematic representation of a screen display from an active application on the PC shown in FIG. 2, in connection with which the software of the preferred embodiment locates a phone number to dial.

Applications 13 typical generate an output for viewing on a screen. FIG. 3 shows a screen 20 for displaying selected text (e.g. 555-1111) from an active application 22 (e.g. email application), against a background application 23 (e.g. Excel®) having an application cell 24. The notional screen layout of FIG. 2 will, of course, vary from one computer session to the next, depending on which applications are executed, etc. A mouse cursor 25 is displayed under control of mouse controller 5 (FIG. 1) in a well known manner.

Figure 4:
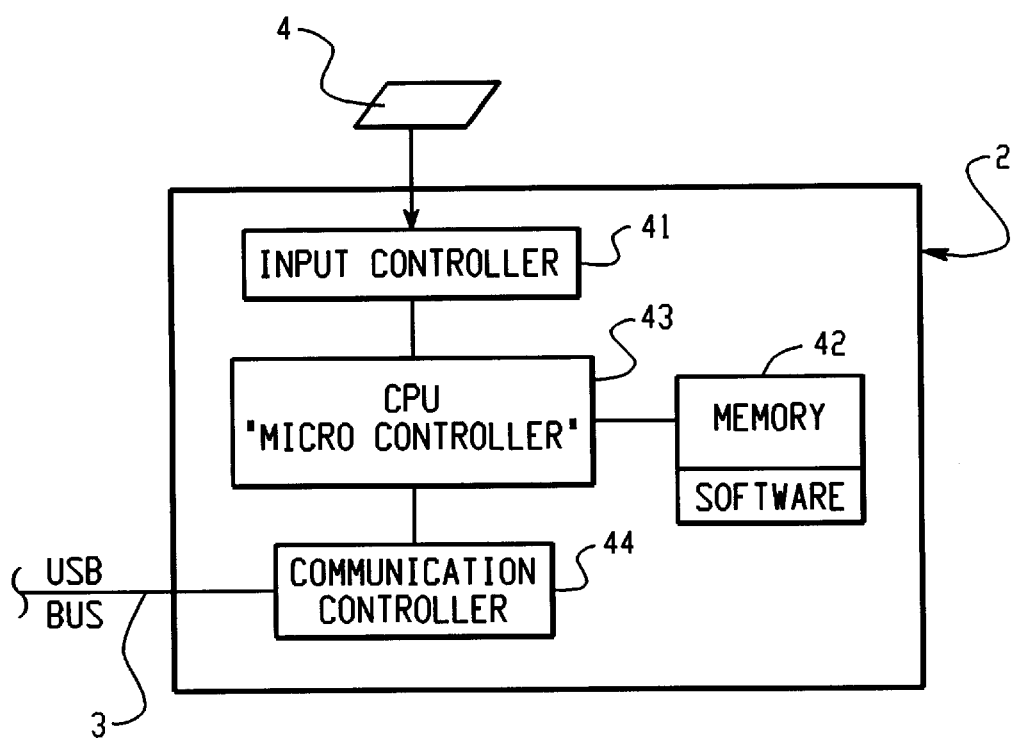
FIG. 4 is a schematic representation of a phone forming part of the CTI system of FIG. 1.

As shown in FIG. 4, within the phone 2, an input controller 41 is provided for communicating with CPU 43 in response to activation of dial button 4. CPU 43 executes software which is resident in memory 42 (e.g. RAM). CPU 43 also transmits and receives data from the communication line 3 (e.g. USB bus) via communication controller 44.

In operation, a user activates (e.g. presses) the dial button 4 in response to which the phone 2 queries the PC 1 (via communication line 3) for a phone number to dial. is The operating system of the PC 1 spawns a process 14 which checks for a phone number in the active application 13 and returns the phone number to the phone 2 via communication line 3.

More particularly, with reference to FIGS. 1 to 4 in combination, in response to pressing the dial button 4, input controller 41 (FIG. 4) of the phone 2 signals CPU 43 that the button 4 has been activated. The CPU 43 then runs software 42 for generating a signal over the line 3, and waits for a response from the PC 1. The signal on line 2 is detected by USB driver 11 (or other appropriate driver) running in memory 31 on PC 1.

Pseudo code for the software 42 executed within phone 2 is as follows:

```
Procedure OTBD_Pressed
BEGIN
    Signal-PC-That-OTDB-is-pressed();
    wait-for-response();
    number-to-dial:=response-from-PC;
    dial(number-to-dial);
END
```

The process 14 spawned by operating system 10 in PC 1 provides a method for finding phone numbers displayed on screen 20. In the four-step method described below, any methods enclosed with {} indicate a Microsoft specific function call which is available to all software running on Windows NT 3.51, NT 4.0 and Windows 95. It is well within the skill of a programmer to execute any of these functions. Details about the functions are available on the Microsoft Developer Network CD-ROM Development Library (e.g. January 1996 edition). This CD "reference library" is Microsoft part number 69145.

The method of the present invention, as executed by process 14 is as follows:

1. Find the active application (22) on the screen (2)

For example by using the {GetForegroundWindow} function a handle can be obtained to the active window, or NULL if there is no active window.

2. If there is an Active window, see if the user has highlighted anything in the application (13), and determine if it is a phone number (see below).

For example, by using the {EM_EXGETSEL} function to the active application the selected text can be obtained.

3. If nothing is selected, or the process is unable to resolve a phone number in step 2, query the OS (10) for the present mouse cursor position (25). Ask the window under the cursor for all of the text within a pre-set (user definable) distance of the mouse cursor, and search for a phone number.

For example, by using the {GetCursorPos} and {WindowAtPoint} functions it is possible to determine which window the user is pointing at. Then, by sending {SetForegroundWindow} that window can be brought to the foreground. By sending {EM_GETTEXTRANGE} to the now active application, the text in the area of the mouse pointer is obtained and the process can search for a telephone number, as discussed in greater detail below.

4. If a phone number still has not been found, capture the screen to RAM and use Optical Character Recognition (OCR) to read all of the text from the screen. The necessary screen capture utility and optical character recognition software are not described in detail herein, but are freely available and commonly and easily used for many other applications. Finally, the process tries to find a phone number from the OCR text (e.g. "2212" at (24) can be found with this method if the email app (22) does not have a phone number in it).

Screen Capture programs are well known and easy to find and implement. For example, the product Lview Pro from the MMEdia Research, 1501 East Hallendale Beach Boulevard, #254, Hallendale, Fla., 33009 is one of many available screen capture programs.

Using the graphical data from the screen capture, use one of the many available OCR programs to "read" the screen capture, and covert any characters/words/numbers on the screen to text. Then, parse the text for a phone number (see below). An example of easily available OCR software includes Xocr, Martin Bauer, Zeppelinstr 97, 70193 Stuttgart Germany.

If a number still cannot be found, the user can be connected to a default extension (e.g. a switchboard).

The pseudocode for finding phone numbers is as follows:

```
Procedure find_PhoneNumber()
BEGIN
    IF(is-there-an-active-window-on-screen)
    BEGIN
        text:=get-selected-text;
        number:=findPhoneNumbert(text);
        IF(number !=nil) return(number);
    END;
    END
    ELSE
    BEGIN
    make-window-under-mouse-pointer-foreground();
    text:=-text-in-region-of-mouse-in-foreground-window();
    number:=findPhoneNumber(text);
    IF (number !=nil)returu(number);
    END;
    /* At this point, there was no number found in the window
    under the cursor, nor any selected text is a phone number.
    So, capture the window and run OCR software on it.*/
    windowGraphic:=captureScreen();
    text:=OCR(windowGraphic);
    number:=findPhoneNumber(text);
    If (number !=nil)
        return(number)
    ELSE
        return (/*DEFAULT NUMBER HERE, EG:ATTENDANT*/)
END
```

The process of finding a phone number in a given array of text is well known in the art, and is described herein to clarify the process discussed above.

The process for finding a phone number in a selection or text depends on user definable parameters. For example, a phone number text string could be:

1. 0, or
2. Any 4 digit sequence, or
3. 9 plus any 7 digit sequence, or
4. any seven digit sequence (the 9 is added automatically), or
5. a 9 plus 3 digits plus a "–" plus 4 digits
6. etc . . .

The pseudocode for resolving a phone number from a set of text, is as follows,

```
Procedure findPhoneNumber(text)
BEGIN
REPEAT
 BEGIN
  TEXT:=strip-non-numerics-from-front-of(text);
  /*Eg, "Donaldx4304" would become "4303",
      "xsdfgsdfg" would become ""*/
  IF (text="")return nil;
  temp:=read-through-valid-phone-characters(text)
  /*0 through 9, -, space, *,# are valid phone characters */
  /*Eg, if text="459–7226 (donald smith)" then temp would
  equal "456–7226"*/
  IF (isValidPhonenumber (temp))
    /*isValidPhoneNumber code would depend on whatever
    criteria the system needs, for example see 1–5 in III*/
    return(temp)
  ELSE
    text:=strip-valid-phone-characters(text)
    /*so, "34 Donald Smith" would become "Donald Smith"*/
 END
END
```

A representative output of this process is shown in Table 1:

TABLE 1

| Example Input | Example Output |
| --- | --- |
| "1234" | "1234" |
| "Donald Smith x4303" | "4303" |
| "Donald's number: 4304 (HOME)." | "4304" |
| "sfgkhdsfljg" | nil |

A person understanding the principles of the present invention may conceive of alternative embodiments or variations thereof. For example, a "phone number" according to the present invention may include an Internet address (expressed either as a domain name or as an IP address), in which case an Internet phone application can be used to place the call over an ISDN line. Also, dial button 4 may be implemented as the third button on mouse 5 rather than being provided on the phone 2. All such embodiments and variations are believed to be within the sphere and scope as set forth in the claims appended hereto.

We claim:

1. A one-button intelligent dialler, comprising:
   a) a phone device for dialling out phone numbers on a phone line;
   b) a dial button; and
   c) a computer for executing at least one application capable of displaying phone numbers on a screen image and, in response to activation of said dial button, executing a process for locating a phone number on said screen image and transmitting said phone number to said phone device whereupon said phone device dials out said phone number on said phone line;
   wherein said process includes first code means for identifying said at least one application displaying said screen image and second code means for identifying selected text within said screen image;
   wherein said process includes third code means for locating said phone number within said selected text; and
   wherein said at least one application further displays a cursor on said screen image, and wherein said process includes fourth code means responsive to one of either said second code means not identifying said selected text or said third code means not locating said phone number, for identifying any text matter within a predetermined distance of said cursor on said screen image and for re-executing said third code means for locating said phone number in said text within said predetermined distance of said cursor.

2. The one-button intelligent dialler of claim 1, wherein said process includes fifth code means responsive to said third code means not locating said phone number in said text within said predetermined distance of said cursor, for performing optical character recognition on said screen image to identify all text displayed on said screen image and for re-executing said third code means for locating said phone number in said text identified as a result of said optical character recognition.

3. The one-button intelligent dialler of claim 1, wherein said phone device and said computer are connected via a serial data line.

4. The one-button intelligent dialler of claim 3, wherein said serial data line is a USB bus.

5. The one-button intelligent dialler of claim 1, wherein said dial button is incorporated into said phone device.

6. The one-button intelligent dialler of claim 1, wherein said dial button is incorporated into a mouse controller connected to said computer.

7. The one-button intelligent dialler of claim 4, wherein said phone device is a USB phone.

8. The one-button intelligent dialler of claim 1, wherein said phone device is an Internet dialler application and said phone number is an Internet address.

9. A method of dialling out via a phone device a phone number displayed within a screen image generated by a software application executed on a computer, said computer being connected to said phone device, said method comprising the steps of:
   a) locating said phone number within said screen image; and
   b) transmitting said phone number to said phone device whereupon said phone device dials out said phone number;
   wherein said step of locating said phone number within said screen image further includes steps of executing first code means for identifying said software application displaying said screen image and executing second code means for identifying selected text within said screen image;
   wherein said step of locating said phone number within said screen image further includes steps of executing third code means for locating said phone number within said selected text; and
   wherein said step of locating said phone number within said screen image further includes steps of executing fourth code means responsive to one of either said second code means not identifying said selected text or said third code means not locating said phone number, for identifying any text matter within a predetermined distance of a cursor displayed by said software application and re-executing said third code means for locating said phone number in said text within said predetermined distance of said cursor.

10. The method of claim 9, wherein said step of locating said phone number within said screen image further includes steps of executing fifth code means responsive to said third code means not locating said phone number in said text within said predetermined distance of said cursor, for performing optical character recognition on said screen image to identify all text displayed on said screen image and reexecuting said third code means for locating said phone number in said text identified as a result of said optical character recognition.

* * * * *